(12) United States Patent
Eto et al.

(10) Patent No.: US 11,093,779 B2
(45) Date of Patent: Aug. 17, 2021

(54) APPARATUS, METHOD AND RECORDING MEDIUM

(71) Applicant: Yokogawa Electric Corporation, Tokyo (JP)

(72) Inventors: Tomoaki Eto, Tokyo (JP); Sawako Ishihara, Tokyo (JP); Hayato Waki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 1 day.

(21) Appl. No.: 16/451,008

(22) Filed: Jun. 25, 2019

(65) Prior Publication Data

US 2019/0392241 A1 Dec. 26, 2019

(30) Foreign Application Priority Data

Jun. 26, 2018 (JP) .............................. JP2018-121293

(51) Int. Cl.
*G06K 9/20* (2006.01)
*G05B 23/02* (2006.01)
*G06F 11/32* (2006.01)
*G06K 9/34* (2006.01)

(52) U.S. Cl.
CPC ....... *G06K 9/2054* (2013.01); *G05B 23/0267* (2013.01); *G06F 11/327* (2013.01); *G06K 9/344* (2013.01)

(58) Field of Classification Search
CPC .. G06K 9/2054; G06K 9/344; G05B 23/0267; G06F 11/327; G06Q 10/20
See application file for complete search history.

(56) References Cited

U.S. PATENT DOCUMENTS 9,830,631 B1   11/2017  Dhua
2015/0120606 A1  4/2015  Hashimoto

FOREIGN PATENT DOCUMENTS

EP     2869221 A2     5/2015
JP     H06295236 A    10/1994
JP     2018-132962  *  2/2017

OTHER PUBLICATIONS

Machine translation for JP 2018-132962 (Year: 2017).*
Extended European Search Report for counterpart European Application No. 19182077.8, issued by the European Patent Office dated Aug. 13, 2019.
Office Action issued for counterpart European Application 19182077.8, issued by the European Patent Office dated Jul. 28, 2020.

* cited by examiner

*Primary Examiner* — Qian Yang

(57) ABSTRACT

An apparatus is provided to solve an issue that detailed information cannot be obtained in some cases because displayed contents is insufficient due to device constraints, the apparatus including an image acquiring section that acquires an image, an extracting section that extracts display information indicated on a device shown in the image, an information-for-identification acquiring section that acquires information for identification for identifying a product of the device and an output section that outputs associated information associated with the information for identification and the display information.

13 Claims, 9 Drawing Sheets

*FIG. 4*

APPARATUS, METHOD AND RECORDING MEDIUM

The contents of the following Japanese patent application(s) are incorporated herein by reference:
NO. 2018-121293 filed in JP on Jun. 26, 2018.

BACKGROUND

1. Technical Field

The present invention relates to an apparatus, a method, a program and a recording medium.

2. Associated Art

Conventionally, from the viewpoints of power saving and miniaturization, in a device such as a field device arranged in a plant, display capability of a display section has been limited and information such as an error is displayed as a code, and for that reason, a user needs to check the displayed contents on an instruction manual and the like. Recently, a technology to electronize an instruction manual and display the instruction manual on a display section for process control has been proposed (for example, see Patent Document 1).
[Patent Document 1] Japanese Patent Application Publication No. Hei6-295236

However, because displayed contents is insufficient due to device constraints, detailed information cannot be obtained in some cases.

SUMMARY

To solve the above-described issue, in a first aspect of the present invention, an apparatus is provided. The apparatus may include an image acquiring section that acquires an image. The apparatus may include an extracting section that extracts display information that is indicated on the device shown in the image. The apparatus may include an information-for-identification acquiring section that acquires information for identification for identifying a product of the device. The apparatus may include an output section that outputs associated information that is associated with the information for identification and the display information.

The information-for-identification acquiring section may acquire information for identification by analyzing appearance of the device shown in the image. The image acquiring section may photograph the image. The image acquiring section may acquire the image from an apparatus that has a photographing function. The information-for-identification acquiring section may acquire information for identification based on information stored in a main body or an accessory of the device.

The apparatus may further include an associated information acquiring section that acquires, from a storage apparatus that stores the associated information in association with each combination of a plurality of pieces of information for identification and a plurality of pieces of display information, the associated information that is associated with the information for identification acquired by the information-for-identification acquiring section and the display information extracted by the extracting section. The extracting section may extract, from respective pieces of display information that are indicated on the device shown in the image, the display information that is associated with the associated information in the storage apparatus.

The display information may indicate a type of an error that occurs in the device. The associated information may indicate at least one of contents of the error, a handling method for the error and an inquiry destination for the error.

The extracting section may extract the display information that indicates a type of an error, from respective pieces of display information displayed by the device shown in the image, based on at least one of a character and a symbol that indicate that the error is occurring. An amount of information included in the associated information may be larger than an amount of information included in the display information.

In a second aspect of the present invention, a method is provided. The method may include an image acquiring step of acquiring an image. The method may include an extracting step of extracting the display information indicated on the device shown in the image. The method may include an information-for-identification acquiring step of acquiring information for identification for identifying a product of the device. The method may include an outputting step of outputting the associated information that is associated with the information for identification and the display information.

In a third aspect of the present invention, a program is provided. The program may make a computer function as an image acquiring section that acquires an image. The program may make the computer function as an extracting section that extracts display information indicated on the device shown in the image. The program may make the computer function as an information-for-identification acquiring section that acquires information for identification for identifying a product of the device. The program may make the computer function as an output section that outputs associated information that is associated with the information for identification and the display information.

In a fourth aspect of the present invention, a recording medium on which a program is recorded is provided. The program may make a computer function as an image acquiring section that acquires an image. The program may make the computer function as an extracting section that extracts display information indicated on the device shown in the image. The program may make the computer function as an information-for-identification acquiring section that acquires information for identification for identifying a product of the device. The program may make the computer function as an output section that outputs the associated information associated with the information for identification and the display information.

The summary clause does not necessarily describe all necessary features of the embodiments of the present invention. The present invention may also be a sub-combination of the features described above.

BRIEF DESCRIPTION OF THE DRAWINGS

FIG. 4 shows a storage section for read/write 442.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

1. Configuration of System 1

Figure 1:
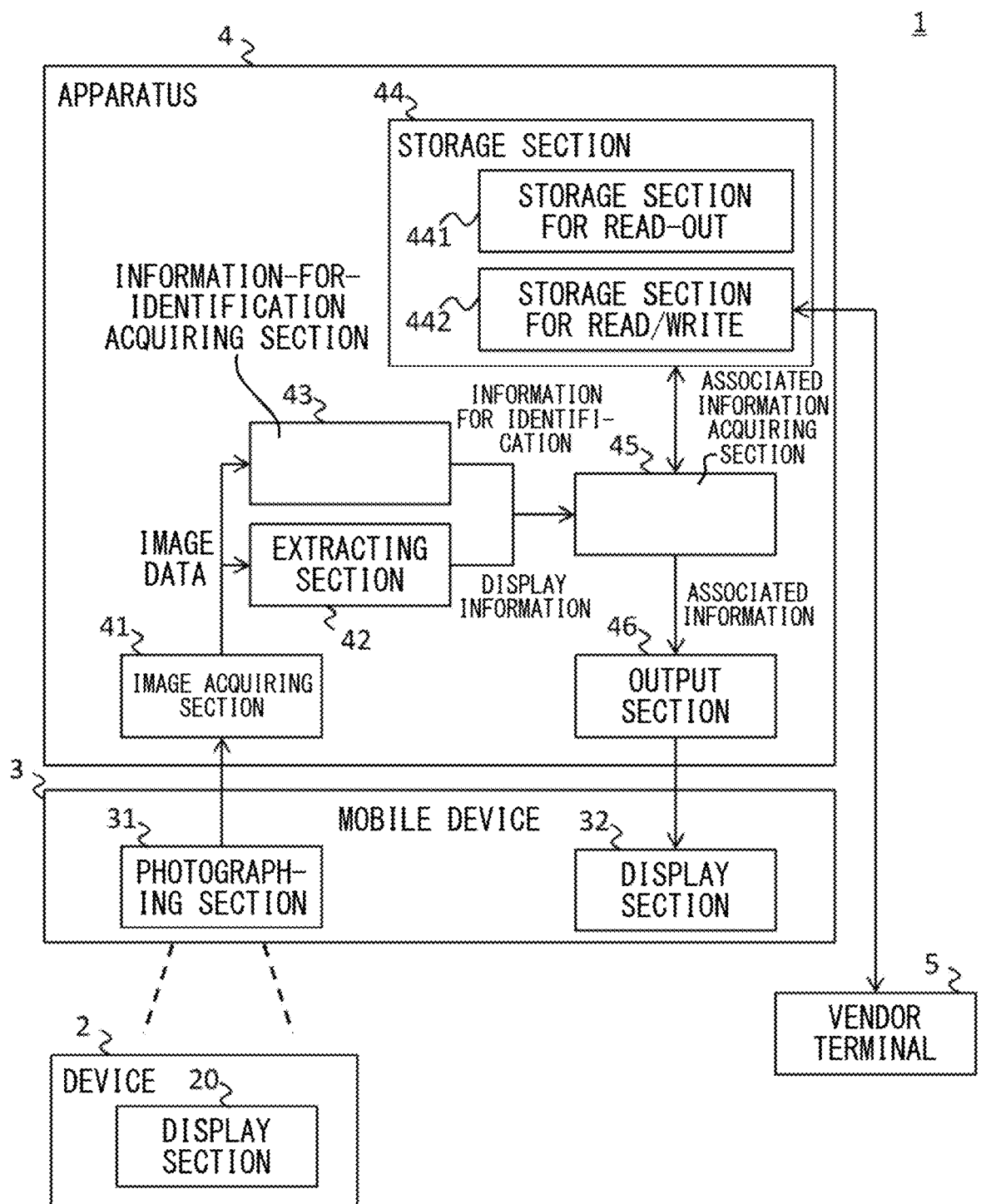
FIG. 1 shows a system 1 according to the present embodiment.

FIG. 1 shows a system 1 according to the present embodiment. The system 1 includes a device 2, a mobile device 3, an apparatus 4 and a vendor terminal 5.

[1-1. Device 2]

The device 2 is a device that has a display section 20 for displaying information, and as one example, is an electric appliance that displays information under control by a control section that is not shown in the drawings. The information (also referred to as display information) displayed by the display section 20 may indicate a type or the like of a product, a state of the device 2, setting contents or a type of a manipulation that may be input. A plurality of display regions may be provided to the display section 20, and a plurality of pieces of display information may be displayed at the same time. At least one piece of display information displayed by the display section 20 may be coded and be displayed as a code such as a barcode or a two-dimensional code (as one example, a QR code (registered trademark)). The display information may also be displayed using a segment display with any number of segments, such as seven, eleven, fourteen, sixteen or twenty-four segments, and may also be displayed using a dot matrix display.

[1-2. Mobile Device 3]

The mobile device 3 is a smartphone, a tablet PC or the like that is carried by a user of the device 2, and is connected to the apparatus 4 by wire or wireless. The mobile device 3 has a photographing section 31 for photographing an image, and a display section 32 for displaying information. Image data such as the image photographed by the photographing section 31 may be supplied to the apparatus 4. The supplied image may be a still image, and may also be a moving image. The still image may also be a frame image in a video. Note that the image supplied to the apparatus 4 may also be an image created by an application (as one example, an authoring application) that is operated on the mobile device 3, may also be a screenshot image when the mobile device 3 displays an image stored inside, and may also be an image supplied from an external device such as a scanner connected to the mobile device 3. The display section 32 has higher display capability than the display section 20 of the device 2. For example, the display section 32 may have a display screen that is larger than the display section 20. Also, a dot matrix display may be used in the display section 32, and resolution of the display section 32 may be higher than resolution of the display section 20 of the device 2.

[1-3. Apparatus 4]

The apparatus 4 outputs information associated with the display information of the device 2, and may also be realized by cloud computing and may also be realized by a physical server or a PC. The apparatus 4 has an image acquiring section 41, an extracting section 42, an information-for-identification acquiring section 43, a storage section 44, an associated information acquiring section 45 and an output section 46.

[1-3-1. Image Acquiring Section 41]

The image acquiring section 41 acquires an image. For example, the image acquiring section 41 acquires an image from the mobile device 3. As one example, the image acquiring section 41 may acquire an image photographed by the mobile device 3. The image acquiring section 41 supplies the acquired image data to the extracting section 42 and the information-for-identification acquiring section 43.

[1-3-2. Extracting Section 42]

The extracting section 42 extracts the display information displayed on a display screen of the display section 20 of the device 2 shown in an image. The extracting section 42 may extract the display information by performing character recognition of displayed contents according to an Optical Character Recognition (OCR) technology. As one example, the extracting section 42 may properly use an algorithm of character recognition for the case of using a dot matrix display and for the case of using a segment display, and may further properly use the algorithm of character recognition according to the number of segments for the case of using a segment display. When the display information is displayed by a code such as a two-dimensional code, the extracting section 42 may decode the code and extract the original display information. The extracting section 42 supplies the extracted display information to the associated information acquiring section 45.

[1-3-3. Information-for-Identification Acquiring Section 43]

The information-for-identification acquiring section 43 acquires information for identification for identifying a product of the device 2. Here, the information for identification may be a product ID of the device 2, as one example. The product ID is identification information for identifying a type of the product, and for example, is a model name of the product. The product ID may also include at least one of version information of the product, a serial number for identifying each of the same products, and lot information per producing unit.

The information-for-identification acquiring section 43 may also acquire the information for identification according to an input by the user, and may also acquire the information for identification by analyzing appearance of the device 2 shown in the image. The image for the analyzation may be supplied from the mobile device 3. The image for the analyzation may also be the same image as or may be a different image from the image in which the display information is extracted by the extracting section 42. The information-for-identification acquiring section 43 may acquire the information of appearance of the device 2 shown in the image by analyzing the appearance, and acquire the product ID by identifying the product from the information of the appearance. Details for the information of the appearance are described below, and a shape, a symbol, a symbol of a nameplate and the like of the device 2 may be included. When the information-for-identification acquiring section 43 acquires a character as the information of the appearance, the information-for-identification acquiring section 43 may perform the character recognition by the OCR technology, similar to the extracting section 42. The information-foridentification acquiring section 43 supplies the information for identification to the associated information acquiring section 45.

[1-3-4. Storage Section 44]

The storage section 44 has a storage section for read-out 441 and a storage section for read/write 442. The storage section for read-out 441 is one example of the storage apparatus, and stores the associated information in association with each combination of a plurality of information for identification and a plurality of display information. The storage section for read-out 441 may not store the associated information for a part of the display information (as one example, a process value and the like) of the display information that may be displayed by the display section 20 of the device 2. The associated information is information associated with the display information of the device 2, and may indicate detailed contents of the display information of the display section 20, for example. An amount of information included in the associated information may be larger than an amount of information included in the display information displayed by the device 2. Note that the amount of the information may indicate that the number of displayed characters is large, as one example. The storage section for read/write 442 stores contents of communication between the apparatus 4 and the mobile device 3, and the like.

[1-3-5. Associated Information Acquiring Section 45]

The associated information acquiring section 45 acquires, from the storage section for read-out 441, the associated information associated with the information for identification acquired by the information-for-identification acquiring section 43 and the display information extracted by the extracting section 42. The associated information acquiring section 45 supplies the acquired associated information to the output section 46.

[1-3-6. Output Section 46]

The output section 46 outputs the associated information. For example, the output section 46 outputs the associated information to the mobile device 3 and causes the display section 32 to display the associated information. The output section 46 may output the associated information such that a display mode is unified regardless of the type of the device 2. Accordingly, the associated information is easily known.

[1-4. Vendor Terminal 5]

The vendor terminal 5 is a terminal that is arranged by a vendor such as a manufacturer or a seller of the device 2, and is connected to the apparatus 4 by wire or wireless. The vendor terminal 5 may be realized by a physical server, a PC or the like. The vendor terminal 5 may perform statistical processing on information in the storage section for read/write 442.

According to the above-described system 1, because the associated information associated with the information for identification of the device 2 and the display information of the display section 20 (as one example, detailed contents of the display information) is output, even if the displayed contents is insufficient in the device 2 due to constraints of the device 2 (as one example, a constraint of power consumption amount, a constraint of the size of the display section 20), detailed associated information can be obtained. For example, in a case where the device 2 has a lower display capability, because the associated information with an information amount that is larger than the display information is output, an effect that enhances the display capability of the device 2 can be obtained even if no modification is added to the device 2. Also, because the associated information can be output without performing the communication with the device 2, load at the time of the communication processing can be prevented from being added to the device 2. Also, because the display information is extracted and the associated information is output by acquiring the image of the device 2, the associated information can be acquired more easily compared to a case where the associated information is acquired by checking an instruction manual and the like.

Also, because the associated information is acquired from the storage section for read-out 441 by the associated information acquiring section 45 of the apparatus 4, the communication with the outside can be omitted, and the output of the associated information can be enhanced compared to a case where the associated information is acquired by supplying the display information and the information for identification to the outside.

Also, because the information for identification of the device 2 shown in the image is acquired, the information for identification is acquired by supplying the image of the device 2 to the apparatus 4. Therefore, compared to a case of inputting the information for identification of the device 2, the information for identification can be easily acquired.

2. Applied Example

Figure 2:
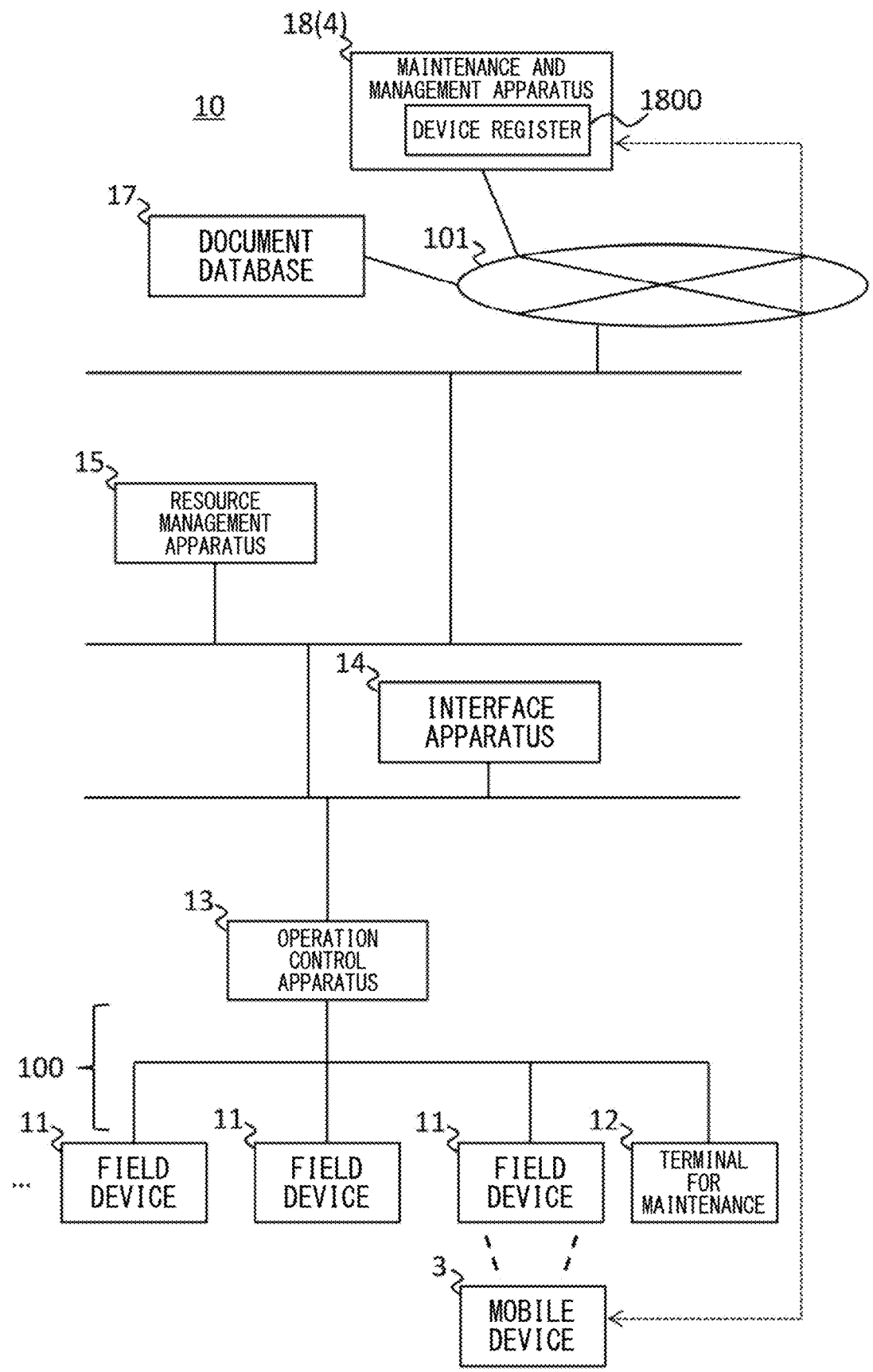
FIG. 2 shows a maintenance and management system 10 to which the system 1 is applied.

FIG. 2 shows a maintenance and management system 10 to which the system 1 is applied.

The maintenance and management system 10 performs maintenance and management of a field device 11 arranged in a facility such as a plant, and includes a plurality of field devices 11, a terminal for maintenance 12, an operation control apparatus 13, an interface apparatus 14, a resource management apparatus 15, a document database 17 and a maintenance and management apparatus 18. Here, as a plant in which the field device 11 is arranged, in addition to an industrial plant such as a chemical plant, a plant that performs management control on a well such as a gas field or an oil field or the surrounding area, a plant that performs management control of power generation such as hydraulic power generation, thermal power generation and nuclear power generation, a plant that performs management control of environmental power generation such as solar power generation or wind power generation, a plant that performs management control of water and sewerage, dam or the like, and the like are given as examples. Each field device 11 and the terminal for maintenance 12 may be arranged to a site in which the process is performed on the facility. Also, the operation control apparatus 13, the interface apparatus 14 and the resource management apparatus 15 may be arranged in a management room, an instrument room and the like in the facility. The document database 17 may be arranged outside the facility. The maintenance and management apparatus 18 may also be arranged in the management room, the instrument room and the like within the facility or may also be arranged outside the facility.

[2-1. Field Device]

The field device 11 is an instrument, a machine or an apparatus, and may also be a sensor that measures a physical quantity such as a pressure, a temperature, pH, a speed, a flow rate in the process of the facility, for example, may be an actuator such as a valve that controls any one of the physical quantities, a flow-rate control valve, an opening/closing valve, a pump, a fan or a motor, may also be a photographing device such as a camera, a video and the like that photographs a situation or an object within the plant, may also be an audio device such as a microphone and a speaker that collects noises and the like within the plant or generates an alarm sound and the like, may also be a position detecting device that outputs position information of each device, and may also be another device. Types of the respective field devices 11 may also be different from each other, and at least some of two or more field devices 11 may also be the same type. Manufacturers of the respective field devices 11 may be the same and may also be different from each other. The field device 11 may be connected to the operation control apparatus 13 by wire or wireless via a control network 100. Communication within the control network 100 may be performed according to the wireless communication protocol of International Society of Automation (ISA), for example, and as one example, may be performed according to ISA 100.11a, Highway Addressable Remote Transducer (HART) (registered trademark), BRAIN (registered trademark), FOUNDATION Fieldbus, PROFIBUS and the like.

[2-2. Terminal for Maintenance]

The terminal for maintenance 12 accesses a setting parameter of the field device 11, and performs reference, setting, modification and the like of a value of the setting parameter. The terminal for maintenance 12 may also be a handheld terminal (HHT) (as one example, a smartphone or a tablet PC) that a site worker carries, or may also be a stationary PC. When the terminal for maintenance 12 is a handheld terminal, the terminal for maintenance 12 may be connected detachably to the field device 11.

[2-3. Operation Control Apparatus]

The operation control apparatus 13 communicates with each field device 11 to control the process. For example, the operation control apparatus 13 acquires a process value from a field device 11 that is a sensor, and drives a field device 11 that is an actuator. The operation control apparatus 13 may supply the process value to the interface apparatus 14 and receive a target value of the process value from the interface apparatus 14. Note that in the present embodiment, an example is described as one example, in which the maintenance and management system 1 includes one operation control apparatus 13 to control all of the field devices 11; however, the maintenance and management system 1 may include a plurality of operation control apparatuses 13 each performing distributed control on some of the field devices 11 respectively. The operation control apparatus 13 may be a Field Control Station (FCS), as one example.

[2-4. Interface Apparatus]

The interface apparatus 14 functions as an interface between an administrator and the facility. The interface apparatus 14 may control the process via the operation control apparatus 13 according to a manipulation by the administrator. For example, the interface apparatus 14 may receive the process value from the operation control apparatus 13 and supply the target value of the process value to the operation control apparatus 13. The interface apparatus 14 may be a Human Interface Station (HIS), as one example, and may be configured with a PC and the like.

[2-5. Resource Management Apparatus]

The resource management apparatus 15 performs online monitoring and centralized management on inside the facility. For example, the resource management apparatus 15 may manage information and the like of the field device 11 acquired by the operation control apparatus 13. The resource management apparatus 15 may be configured with a PC and the like, as one example.

[2-6. Document Database]

The document database 17 associates a product ID (as one example, a model name) of the field device 11 and a document relating to a field device 11 with each other, and stores them. The document may also be a file of an electronized document, and may also be a combination of a destination (such as an URL name) for saving such a file and a file name. The file of the document may also be a text file or may also be an image file of a specification, a manual, an inspection report and the like of the field device 11. The document database 17 may be, as one example, arranged for each vendor of the field device 11. Note that the document database 17 and the maintenance and management apparatus 18 may be connected to the resource management apparatus 15 and the like via a network 101 (as one example, the Internet or a dedicated line).

[2-7. Maintenance and Management Apparatus]

The maintenance and management apparatus 18 supports maintenance and management of the facility. The maintenance and management apparatus 18 may have a device register 1800 that stores at least device specific information about each of the plurality of field devices 11 and the value of the setting parameter of the each of the plurality of field devices 11. The maintenance and management apparatus 18 may be a Device Lifecycle Manager, as one example, may also be realized by cloud computing or may also be realized by a physical server or a PC. The maintenance and management apparatus 18 may be connected to the resource management apparatus 15 and the like by wire or wireless via the network 101.

In the above maintenance and management system 10, as one example, the device 2 in FIG. 1 is the field device 11, and the apparatus 4 in FIG. 1 is the maintenance and management apparatus 18. Accordingly, when the display screen of the field device 11 is small, by photographing an image of display information of the field device 11, and the like by the mobile device 3 at the site and supplying the same to the maintenance and management apparatus 18, the associated information having a larger information amount than the display information can be checked by the mobile device 3. Note that the device register 1800 of the maintenance and management apparatus 18 may be provided to a storage section for read/write 442 of the storage section 44. Also, the apparatus 4 may also be the resource management apparatus 15, the interface apparatus 14 or the operation control apparatus 13. Also, the mobile device 3 may also be the terminal for maintenance 12.

3. Storage Section 44

[3-1. Storage Section for Read-Out 441]

Figure 3:
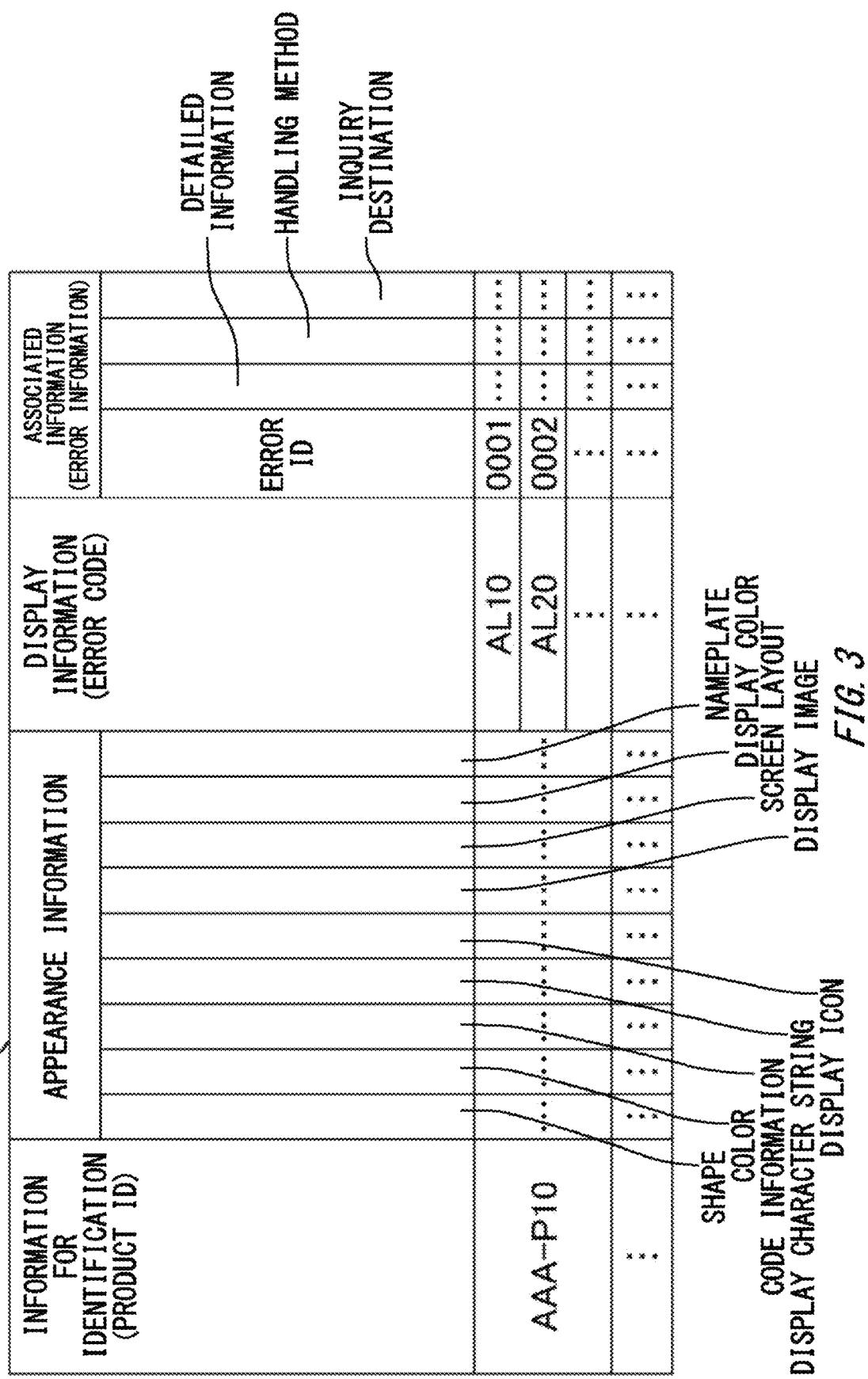
FIG. 3 shows a storage section for read-out 441.

FIG. 3 shows a storage section for read-out 441. The storage section for read-out 441 stores the associated information in association with each combination of the information for identification and the display information. For example, the display information may show a state of the device 2, and in the present embodiment, the display information may show a type of an error (as one example, an error code and an alarm message) occurring in the device 2. When certain contents are indicated in a series of display information that is switched over time by the device 2, the storage section for read-out 441 may store the whole series of display information in association with the information for identification and the associated information. The associated information may be represented in one or more languages. The associated information may indicate at least one of contents of an error (detailed information of an error) occurring in the device 2, a handling method for the error and an inquiry destination for the error. For example, the handling method for the error may be a manipulation method of the device 2, may be a method of analyzing a state of the device 2 or a reason of the error, and may also be an exchanging method of parts. The inquiry destination for the error may be a telephone number, a mail address, an URL or the like of a contact person of the vendor of the device 2. The associated information may also indicate the identification information of the error, a supplier which receives an order of the parts in which the error occurs and the like. Note that in the present embodiment, as one example, the storage section for read-out 441 may store information of appearance for each device 2. The information of appearance may include at least one of a shape of the entire body or a part (as one example, the display section) of the device 2, color of the entire body or a part of the device 2, information of a code that is obtained by coding the product ID of the device 2 and that is provided to the main body or an accessory of the device 2, a character string displayed by the display section 20, an icon, a display image, a screen layout, a display color and a symbol of a nameplate. Among the above, the code is a barcode or a two-dimensional code (as one example, a QR code (registered trademark)), and is provided by sticking, printing or engraving. The code may also be provided to the nameplate that is attached to the device 2 by sticking, printing or engraving. The accessory of the device 2 to which the code is provided may also be a wall-type or rack-mounting type panel into which the device 2 is embedded. In FIG. 3, as one example, associated information is stored, which is about a field device 11 having a product ID "AAA-P10" and error codes "AL10" and "AL20" displayed by the field device 11.

According to the information within the storage section for read-out 441 as described above, because the display information indicates a type of an error occurring in the device 2, and the associated information indicates at least one of the contents of the error, the handling method for the error and the inquiry destination for the error, the contents of and the handling method, the inquiry destination for the error occurring in the device 2, and the like can be easily checked. Therefore, the error can be handled rapidly needless to check an instruction manual. Also, when the associated information is represented by a plurality of languages, because the associated information represented by a language that a user uses can be output, the associated information can be surely checked.

[3-2. Storage Section for Read/Write 442]

Figure 4:
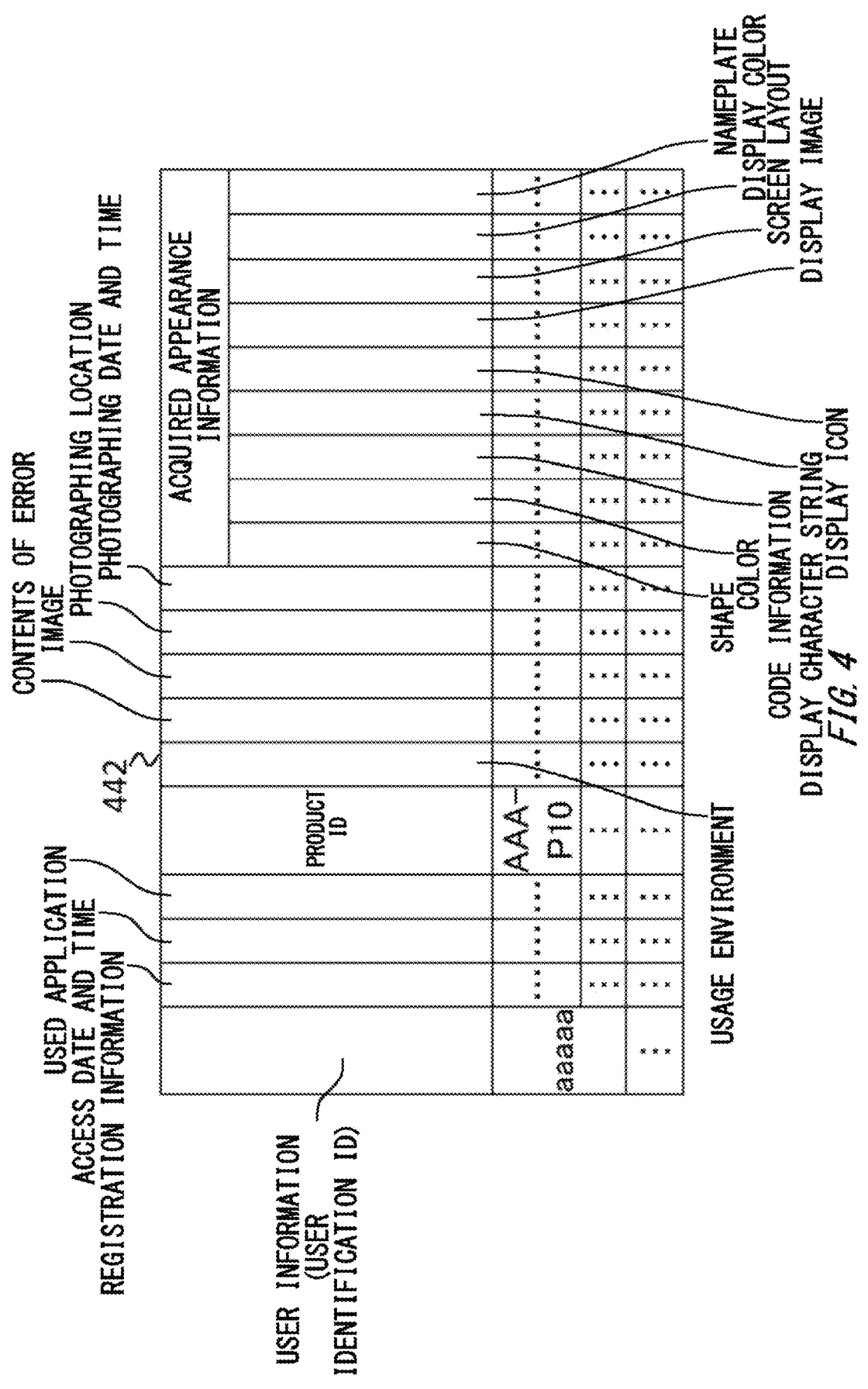

FIG. 4 shows a Storage section for read/write 442. The storage section for read/write 442 may include, for each user or each device 2, at least one of user information (as one example, a user identification ID user name, login information), registration information of the user to the apparatus 4 (as one example, a company to which the user belongs, a zone and the like), access date and time from the mobile device 3, a type of an application in the mobile device 3 that has been used during the communication with the apparatus 4, the product ID of the device 2 acquired by the information-for-identification acquiring section 43, an usage environment of the device 2, the contents of the error, an image acquired by the image acquiring section 41, a photographing location of the image, photographing date and time, and information of appearance acquired by the information-for-identification acquiring section 43. As one example, the usage environment of the device 2 may include at least one of a location in which the device 2 is used, a height above sea level, a temperature and humidity when the device is used, an operation cycle and the like. The contents of the error may include at least one of an error ID of the occurring error, a situation in which the error occurs (the usage environment and the like of the device 2), version of the device 2, lot information of the device 2, the handling contents, the handling result and the like. Note that among the above information, the user information, the registration information, the access date and time, and the type of the used application may be acquired from the contents of communication between the apparatus 4 and the mobile device 3. The photographing location and the photographing date and time of the image may be acquired from EXIF data of the image data, and the usage environment of the device 2 may also be identified according to the photographing location and the photographing date and time, and may also be acquired by a user input to the mobile device 3. The contents of the error may also be acquired by the information-for-identification acquiring section 43 and the associated information acquiring section 45, may also be acquired by the user input to the mobile device 3, and may also be acquired by the communication between the mobile device 3 and the device 2. The information acquired by the information-for-identification acquiring section 43 may include at least one of the information of appearance acquired from the image, the information acquired by the input by the user and the information acquired by the communication with the main body or the accessory of the device 2. Note that in FIG. 4, as one example, the contents of the error, and the like of a field device 11 having the product ID "AAA-P10" that a user having a user identification ID "aaaaa" uses is stored.

According to the information within the storage section for read/write 442 as described above, various statistical processing can be performed at the vendor terminal 5. For example, the vendor terminal 5 may access the information to which the vendor has an access authority of the information within the storage section for read/write 442, and extract at least one of the usage environment and the contents of the occurring error for each product of the device 2 or for each user to perform the statistical processing. Accordingly, a function that has a high frequency of use or a tendency of the error (as one example, a function or usage environment in which the error easily occurs) can be known quantitatively. Also, according to the image of the device 2 displaying the error code (also referred to as the current device 2) being stored in the storage section for read/write 442, the vendor terminal 5 may analyze the registered contents of the error for the device 2 having the same product ID as the current device 2 and identify the reason of the error in the past to determine the handling method for the error of the current device 2. The vendor terminal 5 may compare the information (for example, the usage environment) obtained for the current device 2 with the contents of the error in the past to determine the handling method in the descending order of possibility of resolving the error. Further, when the user has contacted the inquiry destination indicated in the associated information displayed by the mobile device 3, the vendor terminal 5 may send the determined handling method to the mobile device 3 or an operator of a vendor that receives the contact may also guide the handling method.

4. Operation

Figure 5:
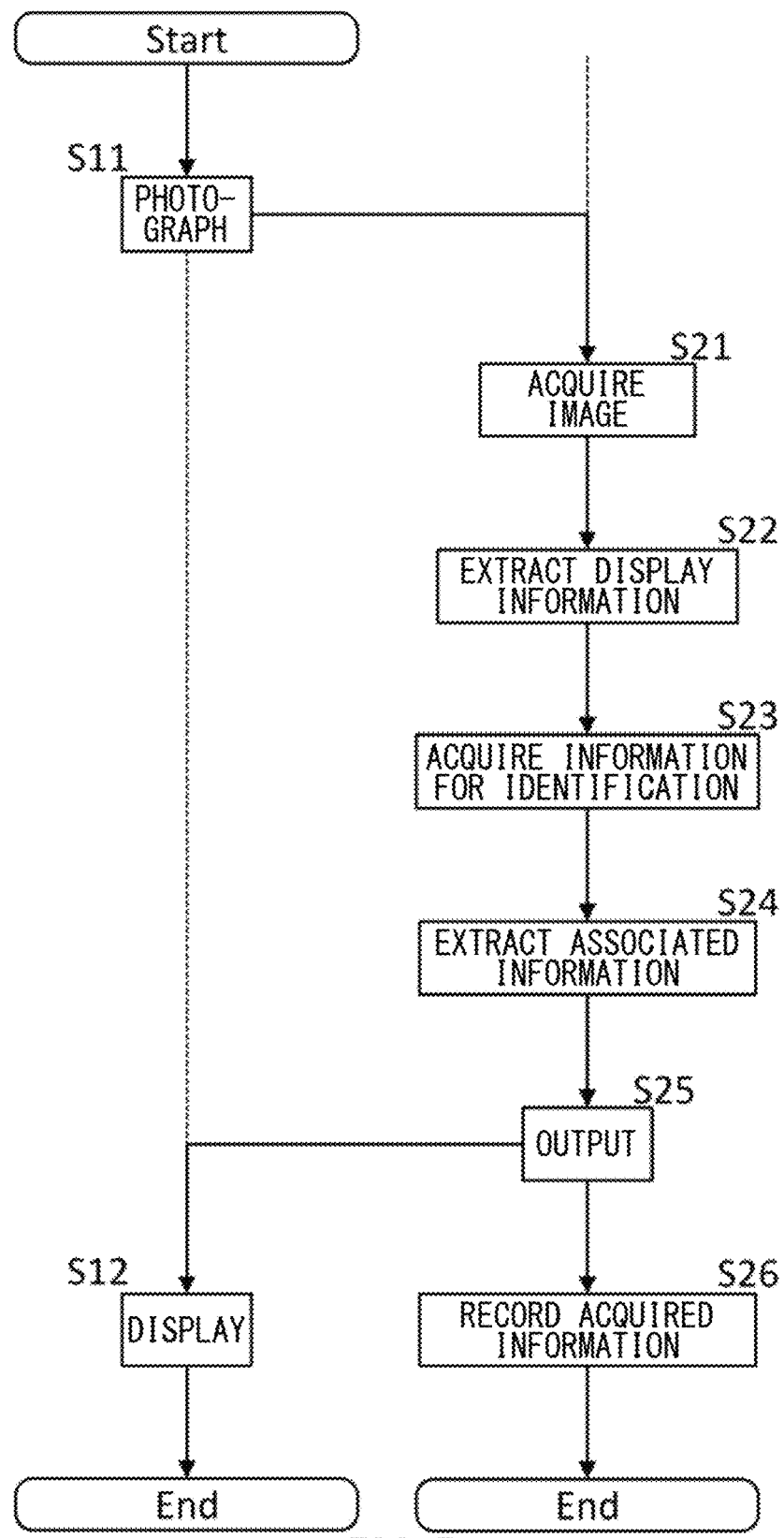
FIG. 5 shows an operation of the system 1 according to the present embodiment.

FIG. 5 shows an operation of the system 1 according to the present embodiment. The system 1 displays, to the mobile device 3, the associated information of the display information of the device 2 by performing processes from steps S11 to S26. Note that in this drawing, a description of the operation of the vendor terminal 5 is omitted.

First, in the step S11, the mobile device 3 photographs an image of the device 2 by the photographing section 31 and supplies the image data to the apparatus 4. The photographing section 31 may at least photograph the display section 20. The photographing section 31 may photograph an overall image of the device 2. In this case, the photographing section 31 may also photograph separately or may photograph together the overall image of the device 2 and the image of the display section 20. When the display by the display section 20 is switched over time (as one example, when the error code is displayed flashing or when a plurality of error codes are displayed sequentially), the photographing section 31 may also photograph a moving image, or may also photograph a still image each time when the display information is switched.

In the step S21, the image acquiring section 41 of the apparatus 4 acquires the image supplied from the mobile device 3, and in the step S22, the extracting section 42 in the apparatus 4 extracts the display information displayed on the display screen shown in the image. When a plurality of pieces of display information is displayed on the display screen, the extracting section 42 may extract the display information associated with the associated information in the storage section for read-out 441 among the displayed pieces of display information. Also, when the plurality of pieces of display information are displayed on the display screen, the extracting section 42 may extract the display information that indicates the type of the error based on at least one of the character and the symbol that indicate that the error occurs among the displayed pieces of display information. As one example, when that the error occurs in the device 2 is indicated as a character or symbol such as "Alarm", "AL" and "!", the extracting section 42 may extract the display information that include the character or symbol, or display information that is displayed near the character or symbol. Also, when the photographing section 31 photographs a moving image or a plurality of still images according to the display by the display section 20 of the device 2 that is switched over time, the extracting section 42 may extract the display information each time when the display is switched.

In step S23, the information-for-identification acquiring section 43 of the apparatus 4 acquires the information for identification for identifying the product of the device 2 (in the present embodiment, the product ID, as one example). For example, the information-for-identification acquiring section 43 analyzes the appearance of the device 2 shown in the image and attempts to identify the product ID. The information-for-identification acquiring section 43 may identify the product ID by using the storage section for read-out 441, and may take the information of the appearance acquired by analyzing the appearance of the device 2 shown in the image as a search key to search the product ID corresponding to the information of the appearance within the storage section for read-out 441, as one example. Also, the information-for-identification acquiring section 43 may also identify the product and, further, the product ID from the appearance of the device 2 by performing machine learning using a plurality of images for learning in advance. As the image for learning, images of a plurality of states (as one example, images for each screen layout, for each selection state of a display item, and for each occurrence state of the error) of the device 2 photographed by changing a condition for at least one of the presence or absence of wiring/piping, the presence or absence of a finger that performs the manipulation, the presence or absence of lighting, an angle of the lighting, a photographing angle, a photographing distance and the like may be used. The information-for-identification acquiring section 43 may make one attempt of an attempt to identify the product ID by analyzing the appearance of the device 2 shown in the image and an attempt to identify the product ID from the information of the appearance by the machine learning, and when the product ID is not identified, the information-for-identification acquiring section 43 may make the other attempt. Further, when the product ID is not identified by both of the attempts, the information-for-identification acquiring section 34 may identify, as the product ID of the device 2, a product ID of a product that exists in a plurality of product ID candidates obtained by one attempt thereof and also exists in a plurality of product ID candidates obtained by the other attempt. Also, when the product ID is not identified by any of the attempts, the information-for-identification acquiring section 43 may also identify a product ID, as the product ID of the device 2, which is selected by the user from the plurality of product ID candidates by communicating with the mobile device 3.

When the product ID cannot be identified, the information-for-identification acquiring section 43 may acquire additional information about the device 2 by communicating with the mobile device 3 to make an attempt again to identify the product ID. The additional information may be another image obtained by photographing the device 2, and may also be the information of the device 2 input by the user (as one example, a selected input to options such as the appearance and the function of the device 2). The additional information may be acquired gradually. Note that the information-for-identification acquiring section 43 may also acquire the information for identification according to the contents input from the user to the mobile device 3 without acquiring the information for identification from the image. In this case, the information for identification can be acquired without performing photographing. Also, the information-for-identification acquiring section 43 may also acquire the information for identification based on the information stored in the main body or the accessory of the device 2. For example, in the main body or the accessory of the device 2, the information relates to at least one of the product ID, the setting parameter and the communication data (as one example, the measurement data and the like) may be readably stored by wireless or wired communication. The information-for-identification acquiring section 43 may acquire the information stored in the main body or the accessory of the device 2 via the communications by using the mobile device 3 or without using the mobile device 3. When the product ID is included in the acquired information, the information-for-identification acquiring section 43 may set the product ID as the product ID of the device 2. When at least one of the setting parameter and the communication data is included in the acquired information, the information-for-identification acquiring section 43 may acquire the product ID of the device 2 by using pre-stored database or the like obtained by associating the product ID with the setting parameter and a format of the communication data for each product of the device 2.

In step S24, the associated information acquiring section 45 of the apparatus 4 acquires, from the storage section for read-out 441, the associated information associated with the information for identification that is acquired by the information-for-identification acquiring section 43, and the display information that is extracted by the extracting section 42. As one example, the associated information acquiring section 45 may take a combination of the information for identification acquired by the information-for-identification acquiring section 43 and the display information extracted by the extracting section 42 as a search key to search the associated information within the storage section for read-out 441. Note that when a plurality of pieces of display information corresponding to different pieces of associated information are displayed as well in the device 2, the associated information acquiring section 45 may communicate with the mobile device 3 and cause the user to select any one of the plurality of pieces of display information to acquire the associated information with the selected display information. Also, when a series of display information corresponding to certain associated information is displayed over time in the device 2, the associated information acquiring section 45 may acquire the associated information associated with the whole series of display information and the information for identification. Also, when a plurality of pieces of display information corresponding to different pieces of associated information are displayed over time by the device 2, the associated information acquiring section 45 may also communicate with the mobile device 3 and cause the user to select an image in which any one of the plurality of pieces of display information is displayed to acquire the associated information with the display information of the selected image. Also, when the associated information is represented by a plurality of languages, the associated information acquiring section 45 may also communicate with the mobile device 3 and cause the user to select any one of the plurality of languages only to extract and acquire associated information of a portion that is represented by the selected language. Instead of this, the associated information acquiring section 45 may also communicate with the mobile device 3 and detect a setting language of the mobile device 3 to only extract and acquire associated information of a portion represented by the setting language.

In step S25, the output section 46 of the apparatus 4 outputs the associated information to the mobile device 3, and in step S12, the display section 32 of the mobile device 3 displays the associated information received from the output section 46 of the apparatus 4.

In step S26, the apparatus 4 causes the storage section for read/write 442 to store the information (as one example, user information, access date and time, the acquired image, additional information input by the user for identifying the product of the device 2, the contents of the error, and the like) acquired from the mobile device 3. When causing the storage section for read/write 442 to store the handling result for the error as the contents of an error, the apparatus 4 may cause the user to input, by using the mobile device 3, a manipulation performed by the device 2 and a result of the manipulation by referring to the associated information displayed in step S12.

According to the above operation, when a plurality of pieces of display information corresponding to different pieces of associated information are also displayed by the device 2, the display information associated with the associated information is extracted in the storage section for read-out 441 from the displayed pieces of display information and the associated information with the display information is displayed, and accordingly, the display information that is not associated with the associated information can be prevented from being extracted, and extraction efficiency can be enhanced. Also, when a plurality of pieces of display information corresponding to different pieces of associated information is also displayed by the device 2, the display information indicating the type of the error is extracted from the displayed pieces of display information based on at least one of a character and a symbol that indicate that the error occurs, and accordingly, the contents of the error, the handling method for the error and the inquiry destination for the error can be surely displayed as the associated information. Also, when a plurality of pieces of display information is also displayed by the device 2, because the associated information with the display information selected by the user is displayed, the associated information of the desired display information can be checked.

Also, when a plurality of pieces of display information corresponding to different pieces of associated information are displayed over time by the device 2, because the associated information with the display information selected by the user is displayed, the associated information of the desired display information can be checked.

Also, when a series of display information corresponding to certain associated information is displayed over time by the device 2, because the associated information with the whole series of display information is displayed, if certain contents are indicated by the series of display information, the associated information can be checked.

Also, when the associated information is represented by a plurality of languages, because the associated information of a portion represented by the language selected by the user or a setting language of the mobile device 3 is extracted and displayed, the associated information can be easily and surely checked.

Also, because the information for identification is acquired based on the information stored in the main body or the accessory of the device 2, even if the information for identification cannot be acquired from the appearance of the device 2 shown in the image, the information for identification can be acquired. Therefore, even in a case where the entire appearance of the device 2 cannot be clearly photographed (as one example, a case where the surrounding area is dark, a case where there is an obstacle in the surrounding area of the device 2, and the like), the information for identification can be acquired.

Note that in the operation in FIG. 5, it is described that the information for identification is acquired after the display information is extracted; however, the above order may also be reversed. In this case, when the product of the device 2 is identified by acquiring the information for identification, an optimal algorithm (as one example, when a segment display with 7 segments is used in the display screen, a character extracting algorithm that is suitable for the segment display with 7 segments) may be used for the display screen of the device 2 to perform the character extraction.

Also, although it is described that when the associated information is represented by a plurality of languages, the associated information of a portion represented by the language selected by the user or the setting language of the mobile device 3 is extracted and acquired, the associated information represented by the plurality of languages may also by acquired as they are and be output to the mobile device 3. In this case, the display section 32 of the mobile device 3 may display the associated information in a scroll display according to a scroll manipulation by the user to display the associated information represented by any one of the languages.

5. Display Example

Figure 6:
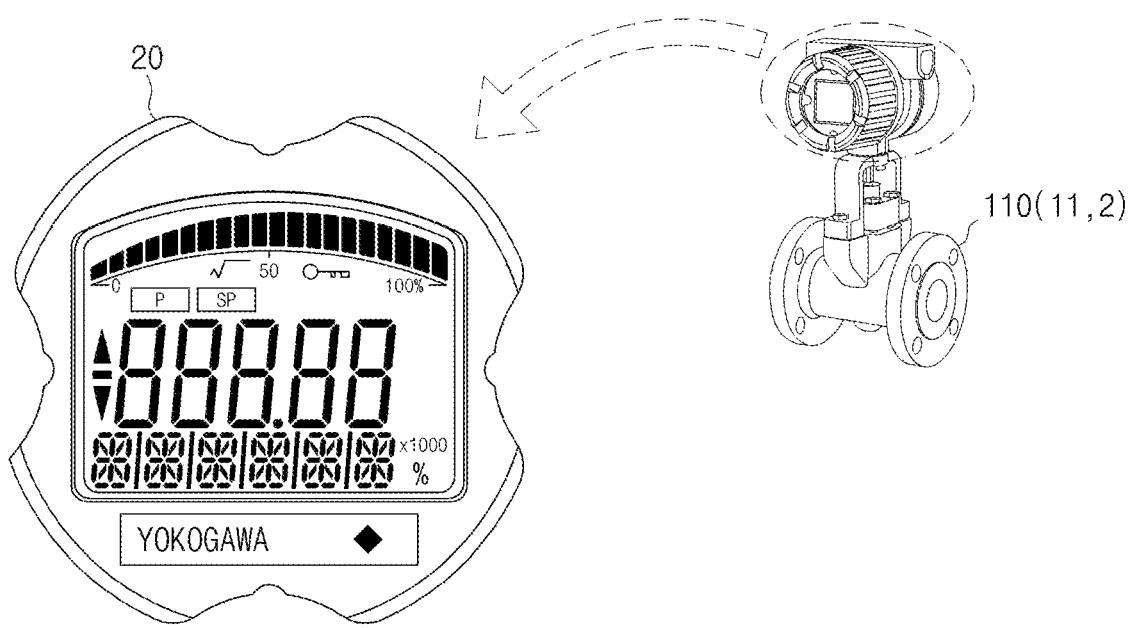
FIG. 6 shows a vortex flowmeter 110 as a field device 11.

FIG. 6 shows a vortex flowmeter 110 as the field device 11. The vortex flowmeter 110 measures at least one of a flow speed, a flow rate and a density of a fluid. The display section 20 of the vortex flowmeter 110 displays the display information using a segment display, as shown in the enlarged portion in the drawing.

Figure 7:
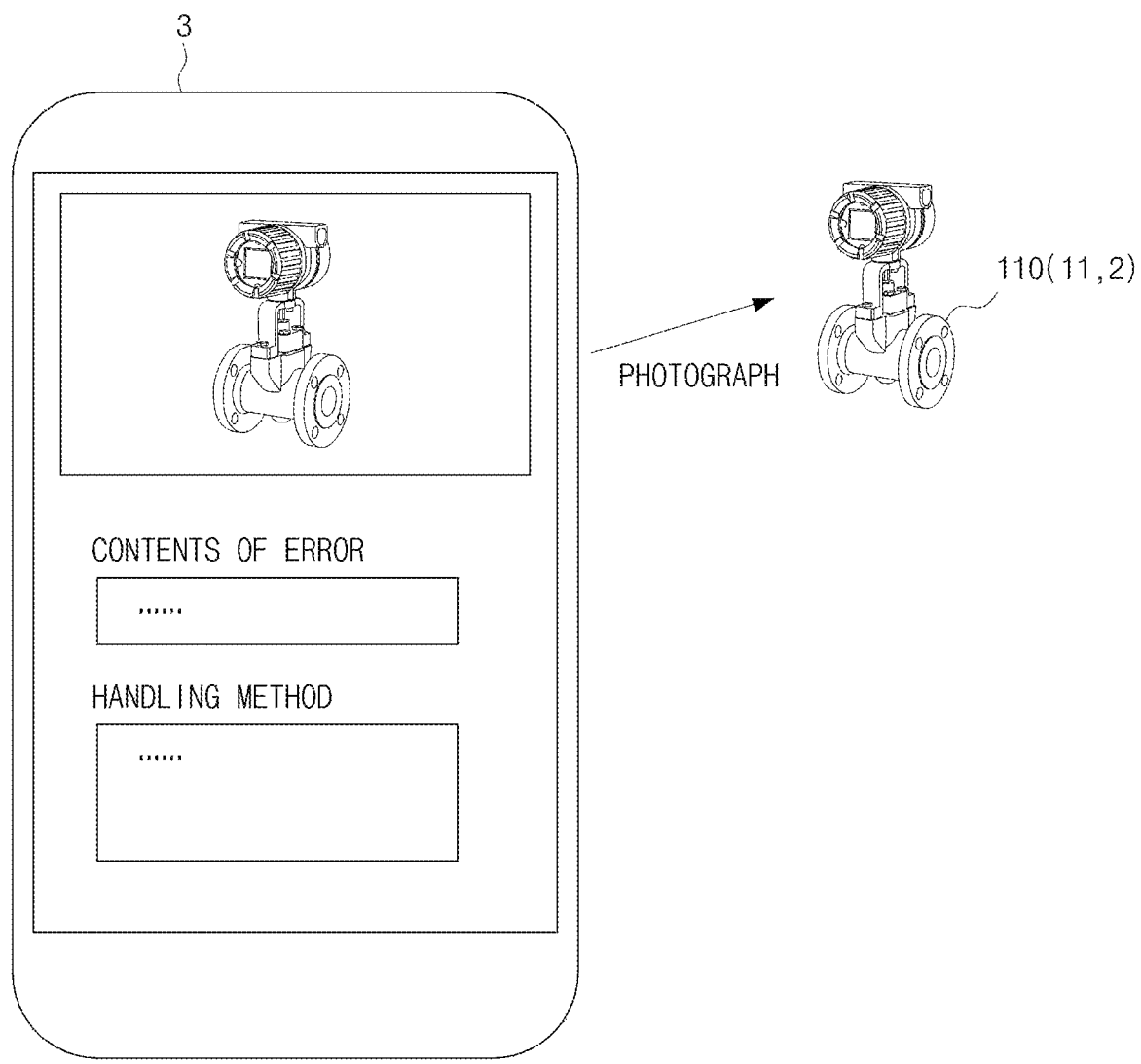
FIG. 7 shows a mobile device 3 on which associated information of display information of the vortex flowmeter 110 is displayed.

FIG. 7 shows the mobile device 3 by which the associated information of the display information of the vortex flowmeter 110 is displayed. As one example in this drawing, as the associated information, the contents of the error generated by the vortex flowmeter 110 and the handling method for the error are displayed. Also, the associated information is displayed in a region that is other than a region in which a photographed image of the vortex flowmeter is displayed of the display region of the display section 32.

Figure 8:
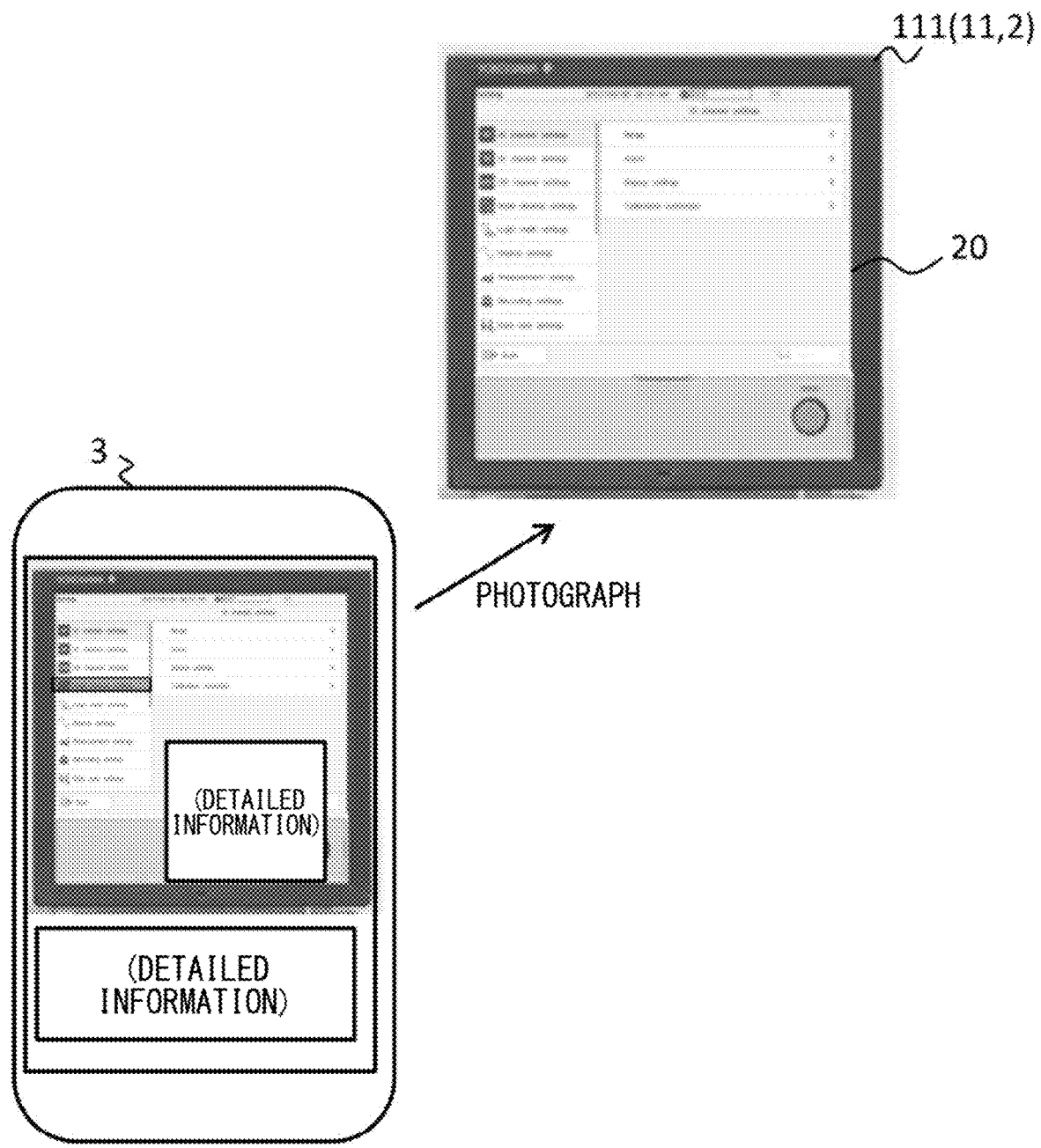
FIG. 8 shows a recorder 111 as the field device 11, and the mobile device 3 on which the associated information of the display information is displayed.
Figure 9:
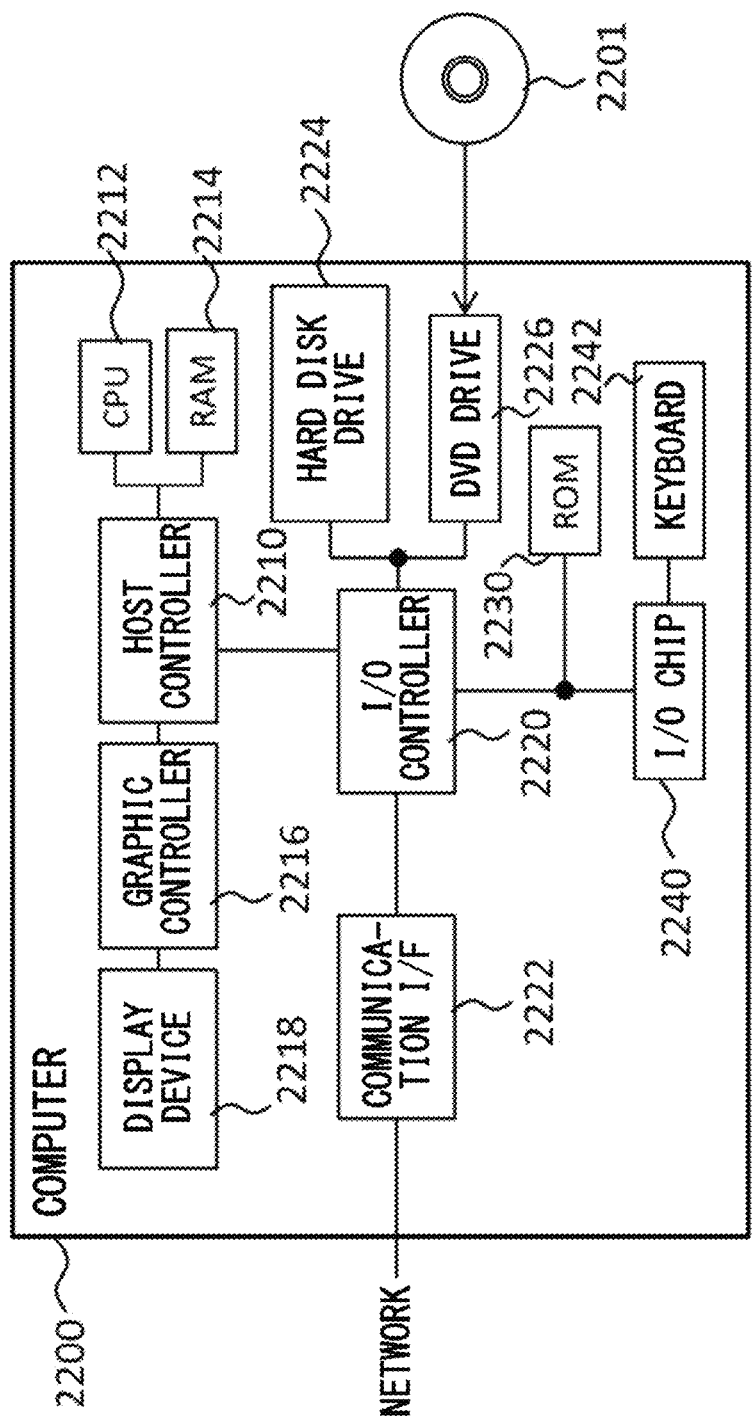
FIG. 9 shows an example of a computer 2200 in which all or some of a plurality of aspects of the present invention may be embodied.

FIG. 8 shows a recorder 111 (also referred to as a data logger, a recording meter) as the field device 11, and the mobile device 3 on which the associated information of the display information of the recorder is displayed. The recorder 111 records the measurement data by the field device 11 as one or more sensors. In this drawing, as one example, the recorder 111 lists and shows a plurality of pieces of display information (as one example, error codes) sent from the connected respective field devices 11.

Also, in the mobile device 3, the associated information of the display information of the recorder 111 is displayed. In this drawing, as one example, the associated information is displayed overlapping the recorder 111 that is displayed by the display section 32. More specifically, the associated information is displayed in a region in which the display information is not displayed of a region in which the photographed image of the recorder 111 is displayed. Also, in this drawing, among the listed plurality of pieces of display information, the associated information with the display information selected by the user is displayed.

6. Modification Example

Note that in the above-described embodiment, it is described that the storage section 44 is included in the apparatus 4; however, the storage section 44 may also be connected to the apparatus 4 as an external storage apparatus. As one example, the storage section 44 may be a document database 17. In this case, the apparatus 4 can be miniaturized.

Also, although it is described that the output section 46 outputs the associated information to the mobile device 3, the associated information may also be displayed on the display section of the apparatus 4 and may also be recorded in a recording medium.

Also, although the apparatus 4 is described as a physical server or the like, the apparatus 4 may also be taken as a mobile device with a photographing function. In this case, the output section 46 may display the associated information. Also, the image acquiring section 41 may photograph an image. Accordingly, compared to a case where an image is received from the outside, the image of the device 2 can be easily acquired. Also, the information-for-identification acquiring section 43 may also acquire the information for identification by wired or wireless communication with the main body or the accessory (as one example, a non-contact type IC chip) of the device 2. Accordingly, the information for identification can be acquired without photographing an image. When the apparatus 4 is a mobile device and has the storage section 44, because the apparatus 4 can output the associated information of the display information without communicating with the outside, the associated information can be checked even in an environment in which the communication cannot be performed.

Also, the apparatus 4 may also be a mobile device that does not have a photographing function. In this case, the image acquiring section 41 may acquire an image from a photographing apparatus that does not have a communication function. Accordingly, an image of the device 2 that is within an area in which it is prohibited to bring a photographing apparatus that has a communication function can be acquired.

Also, although it is described that the apparatus 4 includes the image acquiring section 41, the extracting section 42, the information-for-identification acquiring section 43, the storage section 44, the associated information acquiring section 45 and the output section 46, the mobile device 3 may also include a part of these components. For example, the image acquiring section 41 and the output section 46 may also be included in the mobile device 3. In this case, the image acquiring section 41 may be the photographing section 31, and the output section 46 may be the display section 32.

Also, although it is described that the vendor terminal 5 performs the statistical processing by using the information of the storage section for read/write 442, the mobile device 3 may also perform the same. In this case, the mobile device 3 may perform the statistical processing by accessing the information that the user has the access authority among the information within the storage section for read/write 442. An application that displays the associated information in the mobile device 3 may be the same as or may be different from an application that performs the statistical processing.

Also, it is described that the information for identification for identifying the product of the device 2 is a product ID, and the information-for-identification acquiring section 43 acquires the information of the appearance of the device 2 shown in the image by analyzing the appearance, and uses the information of the appearance as a search key to search the product ID within the storage section for read-out 441, or identifies the product ID from the information of the appearance by the machine learning. However, the information-for-identification acquiring section 43 may also acquire the product ID by supplying the image data acquired by the image acquiring section 41 to an image analyzing device (not shown in the drawings) inside or outside the apparatus 4 to cause the image analyzing device to identify the product ID. Also, the information for identification may also include, in addition to the product ID or instead of the product ID, at least one of the information of the appearance of the device 2 and the image data in which the device 2 is shown. When the information for identification includes the information of the appearance, the information-for-identification acquiring section 43 may also acquire the information of the appearance of the device 2 shown in the image acquired by the image acquiring section 41 by analyzing the appearance, and may also acquire the information of the appearance by supplying the image data to the image analyzing device inside or outside the apparatus 4, to supply the acquired information of the appearance to the associated information acquiring section 45. The associated information acquiring section 45 may acquire, from the storage section for read-out 441, the associated information that is associated with the information of the appearance and the display information extracted by the extracting section 42. When the information for identification includes the image data, the storage section for read-out 441 may store, as the information for identification, images of a plurality of states (as one example, images for each screen layout, for each display item selection state and for each error occurrence state) of the device 2 that is photographed by changing a condition for at least one of the presence or absence of wiring/piping, the presence or absence of a finger that performs the manipulation, the presence or absence of lighting, an angle of the lighting, a photographing angle, a photographing distance and the like for each device 2. The information-for-identification acquiring section 43 may also acquire the image data supplied from the image acquiring section 41 as the information for identification, any may also acquire, as the information for identification, the image data on which an image processing (for example, a process of trimming a region of the device 2, a process of removing noise components (as one example, the wiring/piping within the image) except the device 2) has been performed, to supply the acquired image data to the associated information acquiring section 45. The associated information acquiring section 45 may acquire, from the storage section for read-out 441, the associated information that is associated with the image data and the display information extracted by the extracting section 42.

Also, although the device 2 is described as the field device 11, the device 2 may also be a main body or an accessory (as one example, a remote controller) of a home electric appliance, such as a laundry machine, a rice cooker, a weight meter, a video recording/reproducing machine and an air conditioner.

Also, although it is described that the display section 20 displays the display information using a segment display, a dot matrix display or the like, the display section 20 may also display the display information by a lighting pattern of a plurality of light sources (as one example, LED). For example, the display section 20 may display the type of the error occurring in the device 2 by lighting any one of three light sources. In this case, because the associated information associated with the information for identification of the device 2 and the display information of the display section 20 is output from the output section 46, the effect that significantly enhances the display capability of the device 2 can be obtained needless to apply a modification on the device 2. Note that in this case, the display information may not be recognized by characters, and the extracting section 42 may extract the lighting pattern of the plurality of light sources as the display information.

Also, although it is described that the display information is the information displayed by the display section 20, the display information may also be the information displayed by another portion of the device 2. For example, the display information may also be statically displayed on a manipulation panel or a manipulation button of the device 2 by attaching, printing or engraving, and may also be dynamically displayed by a translucent section on the manipulation panel or the manipulation button, and an internal back light. Also, the display information may indicate the type of the corresponding manipulation button or the contents of a manipulation performed by the manipulation button. In this case, as the associated information associated with the information for identification of the device 2 and the display information, for example, the description of the contents of the manipulation can be output.

Also, it is described that the information-for-identification acquiring section 43 makes an attempt to acquire the information for identification from the appearance of the device 2 shown in the image, and when the information cannot be acquired, the information-for-identification acquiring section 43 acquires the information for identification based on the information stored in the main body or the accessory of the device 2. However, the information-for-identification acquiring section 43 may also make an attempt to acquire the information for identification based on the information stored in the main body or the accessory of the device 2 without making an attempt to acquire the information for identification from the appearance of the device 2 shown in the image, and when the information for identification cannot be acquired by this attempt, the information-for-identification acquiring section 43 may also acquire the information for identification from the appearance of the device 2 shown in the image.

Also, various embodiments of the present invention may be described with reference to flowcharts and block diagrams. Here, the blocks may represent (1) steps of processes in which operations are performed or (2) sections of apparatuses responsible for performing operations. A specific step and section may be implemented by at least one of a dedicated circuit, a programmable circuit supplied together with a computer-readable instruction stored on a computer-readable medium, and a processor supplied together with the computer-readable instruction stored on the computer-readable medium. The dedicated circuit may include at least one of digital and analog hardware circuits, and may include at least one of an integrated circuit (IC) and a discrete circuit. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark)® disc, a memory stick, an integrated circuit card, etc.

Computer-readable instructions may include any one of assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

FIG. 16 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with another electronic device via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads a program and data from the IC card, and in addition to this or instead of this, writes the program and the data into the IC card.

The ROM 2230 stores thereon at least one of a boot program or the like executed by the computer 2200 at the time of activation, and a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when the communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 . . . system; 2 . . . device; 3 . . . mobile device; 4 . . . apparatus; 5 . . . vendor terminal; 10 . . . maintenance and management system; 11 . . . field device; 12 . . . terminal for maintenance; 13 . . . operation control apparatus; 14 . . . interface apparatus; 15 . . . resource management apparatus; 17 . . . document database; 18 . . . maintenance and management apparatus; 20 . . . display section; 31 . . . photographing section; 32 . . . display section; 41 . . . image acquiring section; 42 . . . extracting section; 43 . . . information-for-identification acquiring section; 44 . . .

storage section; 45 . . . associated information acquiring section; 46 . . . output section; 100 . . . control network; 101 . . . network; 110 . . . vortex flowmeter; 111 . . . recorder; 441 . . . storage section for read-out; 442 . . . storage section for read/write; 1800 . . . device register; 2200 . . . computer; 2201 . . . DVD-ROM; 2210 . . . host controller; 2212 . . . CPU; 2214 . . . RAM; 2216 . . . graphic controller; 2218 . . . display device; 2220 . . . input/output controller; 2222 . . . communication interface; 2224 . . . hard disk drive; 2226 . . . DVD-ROM drive; 2230 . . . ROM; 2240 . . . input/output chip; 2242 . . . keyboard

What is claimed is:

1. An apparatus comprising:
a processor configured to:
acquire an image;
extract display information indicated on a display section of a device that is shown in the image;
acquire information for identification for identifying a product of the device by analyzing a screen layout of the display section shown in the acquired image by performing machine learning in advance using a plurality of images for learning that indicate a plurality of states of the device for each screen layout of the display section, the plurality of images being captured while changing a photographing condition; and
output associated information that is associated with the information for identification and the display information.

2. The apparatus according to claim 1, wherein
the processor is further configured to acquire the information for identification by analyzing appearance of the device shown in the image.

3. The apparatus according to claim 1, wherein
the processor is further configured to acquire the information for identification based on information that is stored in a main body or an accessory of the device.

4. The apparatus according to claim 1, wherein
the processor is further configured to photograph the image.

5. The apparatus according to claim 1, wherein
the processor is further configured to acquire the image from an apparatus that has a photographing function.

6. The apparatus according to claim 1, wherein
the processor is further configured to acquire, from a storage apparatus that stores the associated information in association with each of a plurality of combinations of a plurality of pieces of information for identification and a plurality of pieces of display information, the associated information that is associated with the acquired information for identification and the extracted display information.

7. The apparatus according to claim 6, wherein
the processor is further configured to extract, from respective pieces of display information that are indicated on the device shown in the image, the display information that is associated with the associated information in the storage apparatus.

8. The apparatus according to claim 1, wherein
the display information indicates a type of an error that occurs in the device, and
the associated information indicates at least one of contents of the error, a handling method for the error and an inquiry destination for the error.

9. The apparatus according to claim 8, wherein
the processor is further configured to extract, from respective pieces of display information that are displayed by the device shown in the image, the display information that indicates the type of the error based on at least one of a character and a symbol that indicate that the error is occurring.

10. The apparatus according to claim 1, wherein
an amount of information included in the associated information is larger than an amount of information included in the display information.

11. The apparatus according to claim 1, wherein
changing the photographing condition includes changing a condition for at least one of presence or absence of wiring and/or piping, presence or absence of a finger that performs a manipulation, presence or absence of lighting, an angle of the lighting, a photographing angle, and a photographing distance.

12. A method comprising:
acquiring an image;
extracting display information that is indicated on a display section of a device shown in the image;
acquiring information for identification for identifying a product of the device by analyzing a screen layout of the display section shown in the acquired image by performing machine learning in advance using a plurality of images for learning that indicate a plurality of states of the device for each screen layout of the display section, the plurality of images being captured while changing a photographing condition; and
outputting associated information that is associated with the information for identification and the display information.

13. A non-transitory computer-readable medium storing thereon a program that, when executed by a computer, causes the computer to perform operations including:
acquiring an image;
extracting display information that is indicated on a display section of a device shown in the image;
acquiring information for identification for identifying a product of the device by analyzing a screen layout of the display section shown in the acquired image by performing machine learning in advance using a plurality of images for learning that indicate a plurality of states of the device for each screen layout of the display section, the plurality of images being captured while changing a photographing condition; and
outputting associated information that is associated with the information for identification and the display information.

* * * * *